Figure 1:
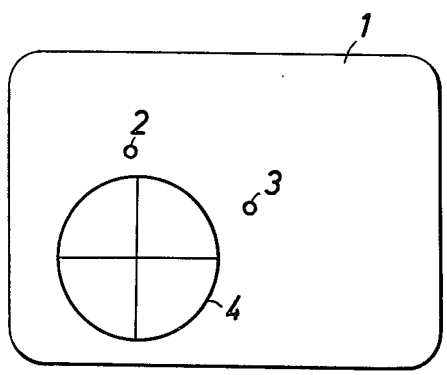

United States Patent [19]

Kretz

[11] 4,119,890
[45] Oct. 10, 1978

[54] METHOD AND EQUIPMENT FOR MEASURING THE DISTANCE BETWEEN TWO POINTS

[75] Inventor: Carl Kretz, Zipf, Austria

[73] Assignee: Kretztechnik Gesellschaft m.b.H., Zipf, Austria

[21] Appl. No.: 803,579

[22] Filed: Jun. 6, 1977

[30] Foreign Application Priority Data

Jul. 14, 1976 [AT] Austria ................................ 5191/76

[51] Int. Cl.² ........................................... G01R 13/30
[52] U.S. Cl. ................................... 315/377; 33/1 SP; 128/2 V
[58] Field of Search ................ 328/189; 324/183, 185; 128/2 V, 2.05 Z; 33/27 C, 149 J, 174 B, 174 G, 1 SP, 1 P; 315/377

[56] References Cited

U.S. PATENT DOCUMENTS 3,027,485  3/1962  Davis .................................... 315/377

FOREIGN PATENT DOCUMENTS 2,619,723  11/1976  Fed. Rep. of Germany .......... 128/2 V Primary Examiner—Nelson Moskowitz
Assistant Examiner—T. M. Blum
Attorney, Agent, or Firm—Kurt Kelman

[57] ABSTRACT

Displays of first and second points are generated on a fluorescent screen. A first mark, which coincides with the display of said first point, is displayed on said fluorescent screen. A linear second mark is displayed on said fluorescent screen. A parameter which controls the position of said second mark on said fluorescent screen is varied in a known manner to move said second mark to a plurality of positions, in each of which said second mark constitutes a display of a circle which is centered on said first point, inclusive of one position in which said second mark is in close proximity to the display of said second point, said parameter having a predetermined, known relation to the radius of said circle so that the value of said parameter is a measure of the distance between said first and second points when said second mark is in said one position and said first mark coincides with the display of said first point. When it is desired to measure the distance between first and second points on a fluorescent screen, the second mark is displayed as at least part of a circle that is centered on said first point.

15 Claims, 5 Drawing Figures

METHOD AND EQUIPMENT FOR MEASURING THE DISTANCE BETWEEN TWO POINTS

This invention relates to a method of measuring the distance between different points of a display on a fluorescent screen, particularly on section surface displays generated as a result of ultrasonic examination, which method comprises a display of adjustable indicating marks. A development of the invention relates to equipment for carrying out that method.

Whereas the above-mentioned application in conjunction with section surface displays generated as a result of ultrasonic examination is preferred, the invention is not restricted thereto. In that application it may be necessary to determine the extent of certain portions of the section surface display, e.g., to determine in medical examinations the extent of an organ or tumor which is displayed. The simplest known solution resides in that a grid is held before the fluorescent screen and the distance is determined in accordance with the locations of the points within the grid. Because the points do not generally lie on a common grid line, it is necessary to determine the $x$ and $y$ coordinates of the points and to calculate the distance from these coordinates. This procedure is time-consuming and has the additional disadvantage that the parallax between the prearranged grid and the fluorescent screen introduces an error into the measurement. If the prearranged grid is replaced by an electronically generated and displayed grid, this involves a high expenditure and eliminates only the parallax error whereas the evaluation remains just as complicated as before. For this reason, another method has been used to obtain more accurate and faster measurements and comprises two marks, which can be horizontally and vertically adjusted independently of each other, displayed on the fluorescent screen. For the measurement, these marks must be caused to coincide with the points which are to be measured. The deflecting voltages required to shift the different marks in the $x$ and $y$ directions represent the coordinates thereof. These voltages can be applied to a computer, which calculates the desired distance from said voltages. The adjustment requires an operation of four control elements, namely, a vertical control element and a lateral control element for each point. Precision controls are required for that purpose because all four voltages are required for a determination of the distance between the two points. A high electronic expenditure is involved. In view of the above-mentioned difficulties, another method has been proposed, in which an electronically generated linear scale is additionally displayed on the fluorescent screen and can be shifted and turned on the fluorescent screen as desired by control means. For a measurement, the control means must be operated to move the scale to the position in which it extends through both points to be measured so that the distance between the two points can be directly determined from the graduations of the scale. That method involves also a considerable electronic expenditure and it is difficult and time-consuming to adjust the scale to the proper position. The adjustment is effected in steps in most cases and it is often necessary to repeat the adjustment several times before the scale line actually coincides with both points.

It is an object of the invention to provide a method which is of the kind described and which enables an exact determination of the distance with means which are simpler than those employed in the previously known methods used for this purpose and in which the required adjustments can be performed in a simple manner, quickly and exactly.

The method according to the invention resides in that the additionally displayed marks comprise at least a circle or arc of a circle and its center, the center of the circle is adjusted to one point, and the radius of the circle is changed intermittently or continuously until it is approximately or exactly at the other point, and the radius of the circle, which represents the distance between the points, is derived from the control operations required for its change and, if desired, is directly indicated.

The displacement of the center of the measuring circle and the change of its radius are preferably performed independently of each other so that the change of one parameter does not influence the magnitude of the other.

For an indication of the radius, a control element for changing the displayed circle, e.g., a voltage control element, may be coupled to a calibrated indicator which is graduated in length units. In the simplest cases, a rotary control element is coupled to a pointer, which is adjustable along a scale that is graduated in length units. Alternatively the circle-generating output voltage of the control element may be applied to a calibrated measuring instrument which is graduated in length units. The desired distance may also be digitally indicated in dependence on the adjustment of the controller. That indication may be additionally displayed on the fluorescent screen of the equipment to be visible there together with the remaining displays.

The term "circle" is understood in its geometrically defined meaning. This means that the curve that is traced a display of those points which are spaced equal distances apart from the center that is displayed. If different scales were used in the $x$ and $y$ directions, the "circle" would be displayed as an ellipse. When one mark is disposed near the edge of the fluorescent screen, only an arc of a circle rather than a full circle may be displayed.

According to a further feature of the invention the center of the circle is represented by a hairline cross, which preferably consists of intersecting lines which represent the vertical and horizontal diameters of the circle and are provided with scale graduations, if desired.

In another embodiment, auxiliary circles which are concentric with the measuring circle and spaced predetermined distances therefrom are displayed in addition to the measuring circle, and the measuring circle is preferably displayed in a mode which differs from the mode of display of the auxiliary circles. In that embodiment of the method, an intermittent adjustment of the measuring circle may be provided for. In that case the result is obtained by an interpolation between the measuring circle and the auxiliary circles. When the measuring circle is continuously adjustable, the overall evaluation can also be facilitated by auxiliary circles which are disposed at a known distance from the measuring circle, e.g., when it is desired to determine the size of a layer which surrounds one point to be measured.

In another embodiment it is possible to display a targetlike array of circles or of arcs of circles, which are spaced fixed, known distances apart from a common center, which is adjustable in unison with the circles or arcs of circles.

A preferred equipment for carrying out the method according to the invention constitutes an accessory for a display unit having a fluorescent screen and generates output voltages, which are applied to the display unit and are controllable to generate adjustable luminous marks on the fluorescent screen, and is characterized in that it comprises a sine wave voltage generator for applying an output voltage to two leads, one of which incorporates a quadrature phase shifter and each of which includes an analog adder for adding to the sine or cosine voltage a d.c. voltage which is adjustable by control elements independently of the voltage added in the other lead, and the resulting sum voltages and the adjusted d.c. voltages are adapted to be applied to an electronic sequential switch, which sequentially applies to the display unit one of the sum voltages together with the d.c. voltage not included therein, than the other sum voltage and the d.c. voltage not included therein, and then both sum voltages.

The use of this equipment results in the display of a circle and a hairline cross.

The sequential switch is preferably triggered by the sine wave generator.

The adjustment will be much simplified if a single-knob controller is used to adjust the two d.c. voltages and the a.c. voltage, preferably in an arrangement in which a control shaft is provided, which is rotatable by means of a knob and controls a controller for the a.c. voltage and together with that controller is carried by a gimbal mount, which has two shafts that extend at right angles to each other and are connected to respective rotary control elements, which are adjustable by a pivotal movement of the control shaft to control the two d.c. voltages.

Further details and advantages of the invention will become apparent from the following description of the accompanying drawings, in which the invention is shown by way of example.

Figure 2:
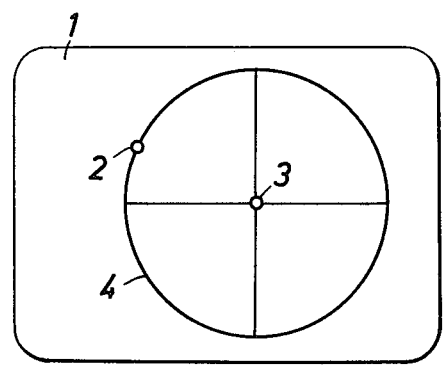
Figure 3:
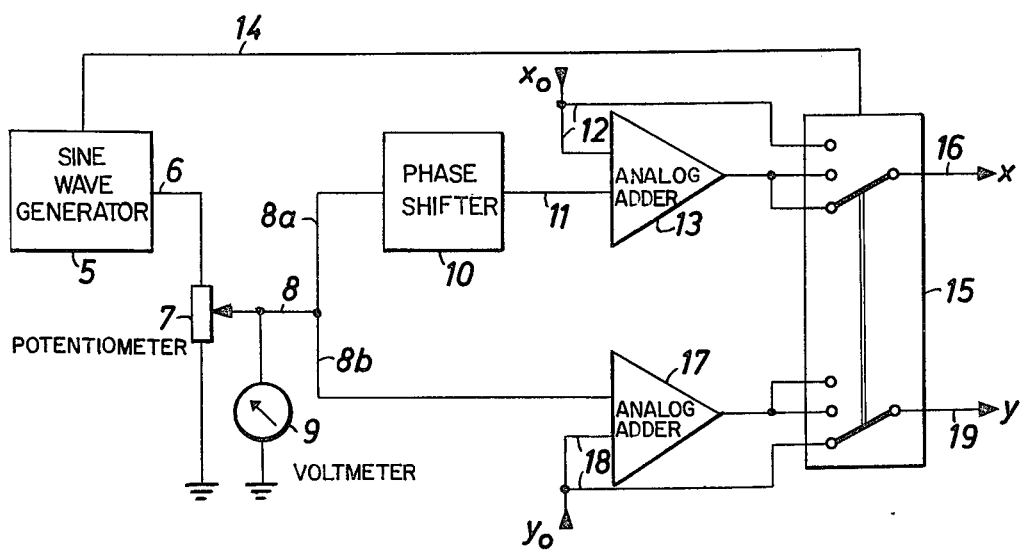
Figure 4:
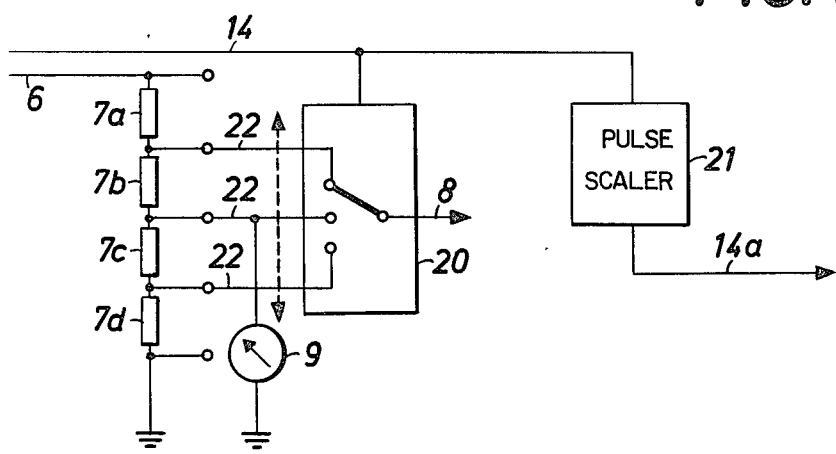
Figure 5:
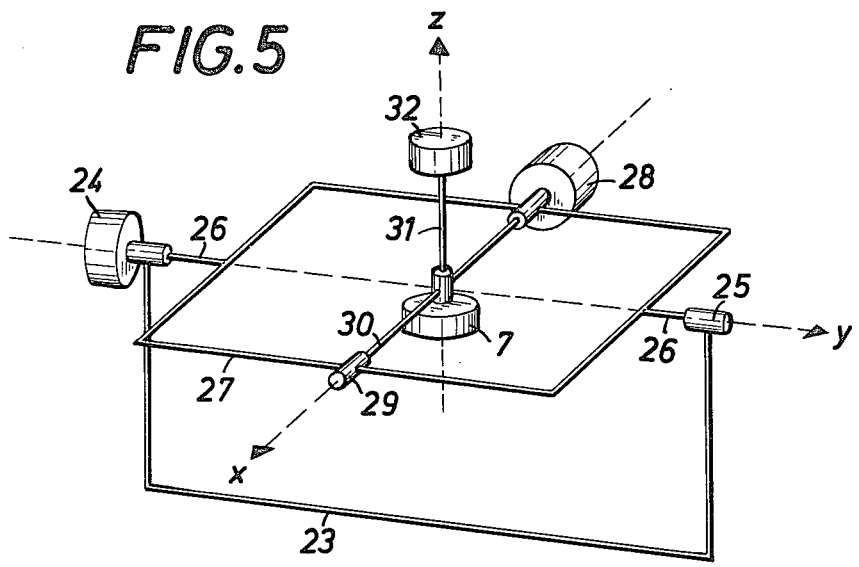

FIGS. 1 and 2 are diagrammatic views representing the display on a fluorescent screen before and after the adjustment, FIG. 3 is a block circuit diagram showing equipment for carrying out the method according to the invention, FIG. 4 shows a modification of FIG. 3, only the altered parts being shown, and FIG. 5 is a diagrammatic view showing a single-knob controller.

FIGS. 1 and 2 show a fluorescent screen 1, on which two points 2 and 3 are indicated, which represent, e.g., interesting points of a section surface display. The distance between these two points is to be determined. In response to the operation of a turn-on switch, a circle 4 and coordinate axes intersecting at a point of intersection are displayed on the fluorescent screen 1. To perform the measurement, control elements are first operated to cause the center of the circle, i.e., a first visible mark consisting of the point of intersection of the coordinate axes, to coincide with one of the points to be measured, e.g., with point 3. Another control element is then operated to effect a continuous change of the radius of circle constituting a second visible mark 4 until the arc of the circle extends through the other point, in the illustrative embodiment through the point 2, as has been illustrated in FIG. 2. Compared with known methods this affords the advantage that only three rather than four adjustments are required. The adjustment of the radius of the circle so that the latter extends through the point 2 is simpler and can be performed more quickly than vertical and horizontal adjustments of a single field point, or a line which is adjustable relative to point 3, until said field point or line coincides with the panel 3. This is due to the fact that the arc of a circle must necessarily extend through the point 2 at one time during the change of its radius. On the other hand, when a point is adjusted, the $x$ and $y$ values may have to be repeatedly changed until the coincidence has been obtained. It will be described hereinafter that it is possible within the scope of the invention to perform all adjustments that are required by means of a single control knob. A further advantage of the method resides in that only a single electrical parameter, namely, the voltage which determines the radius of the circle, must be accurately known because the paramters which define the location of the center of the circle do not affect the measurement and for this reason need not be known. As a result, the electronic expenditure is much reduced.

FIG. 3 is a block circuit diagram showing an arrangement for carrying out this method. A sine wave generator 5 applies a sine wave output voltage via a lead 6 to a potentiometer 7. An adjusted output voltage is applied from the potentiometer via leads 8 to a voltmeter 9, which measures and indicates the peak value of said partial voltage. This voltmeter can be omitted if the output voltage of the generator 5 is sufficiently constant and the potentiometer 7 is a precision potentiometer and each adjusted position of the same corresponds to an exactly known relation between the output and input voltages of the potentiometer so that the output voltage of the potentiometer is exactly known from its adjusted position. In that case the values can be read directly from a scale which is associated with the slider of the potentiometer. It is essential only that the output voltage is exactly known. Because this value defines the radius of the circle and the distance to be measured, as will be shown hereinafter, the scale of the measuring instrument or of the potentiometer is suitably provided with such inscriptions that the radius of the circle can be directly read from the scale. The tapped sine wave voltage is then applied to two branch leads 8a, 8b of lead 8. Branch lead 8a includes a phase shifter element 10, by which the phase of the sine wave voltage is shifted 90° so that a cosine wave voltage is applied via a lead 11 to an analog adder 13. A controlled d.c. voltage $x_o$ is also applied via lead 12 to the adder 13 and is added therein to the cosine wave voltage which is applied. The second branch lead 8b is directly connected to an analog adder 17, to which a controlled d.c. voltage $y_o$ is also applied via a lead 18. This d.c. voltage $y_o$ is added in the adder 17 to the sine wave voltage. As a result, the following voltages appear at the outputs of the two analog adders 13 and 17:

At 13: $x = x_o + r \cos(a\,t)$ at 17: $y = y_o + r \sin(a\,t)$

In these voltages the parameters $x_o$ and $y_o$ are adjustable independently of each other by two control elements, which are not shown in the circuit diagram. The parameter $r$ can be adjusted by the potentiometer. $a$ is the angular frequency of the sine wave voltage generated by the generator 5. If these voltages were applied to the $x$ and $y$ deflecting electrodes, respectively, of the cathode ray tube, a circle having a center that is determined by the voltages $x_o$ and $y_o$ and a radius which is proportional to $r$ would be displayed on the fluorescent screen.

Because two coordinate axes are to be displayed too, the outputs of the analog adders 13 and 17 are applied to an electronic sequential switch 15, to which voltages $x_o$ and $y_o$ are also applied via leads 12 and 18 and which can assume three positions and in its uppermost position applies to its outputs 16 and 19 the voltages $$x = x_o$$

$$y = y_o + r \sin(a\,t)$$

so that a straight line having a length of $2r$ is displayed on the fluorescent screen on the level defined by $x_o$. In its intermediate position, the sequential switch 15 applies the following voltages to its inputs 16 and 19:

$$x = x_o + r \cos(a\,t)$$

$$y = y_o + r \sin(a\,t)$$

A circle having a radius $r$ and a center defined by $x_o$, $y_o$ is now displayed on the fluorescent screen. In its last (lower) position, the sequential switch 15 has the following output voltages $$x = x_o + r \cos(a\,t)$$

$$y = y_o$$

so that a line is traced which has the length $2r$ and is at right angles to the first line and extends also through the center of the circle. As a result, the circle and two diameters which are at right angles to each other are traced during each switching cycle. Owing to the persistence of the fluorescent screen and of vision, all three lines are seen at the same time when the sequential switch is operated at a sufficiently high switching frequency. The sequential switch 15 may be free-running if its switching frequency is much higher or much lower than the frequency of the sine wave voltage generated by the generator 5. If these two frequencies are approximately the same, stroboscopic effects may occur so that, e.g., only part of the circle is traced and revolves slowly. To eliminate this undesired result, the sequential switch 15 may be triggered by the sine wave generator via a lead 14 in such a manner that the sequential switch 15 switches to its next position whenever a period of the sine wave voltage has been completed. Because the measuring circle should be visible on the fluorescent screen at the same time as the picture to be evaluated, the output voltages appearing at 16 and 19 are not directly applied to the display unit but are applied to an electronic change-over switch, which alternatingly connects the display unit to the measuring device and to the device for generating the picture to be measured. Because such devices for controlling an intermittent display of pictures are known and are not a subject matter of the invention, they are not discussed more fully and are not shown in the block circuit diagram.

In the modified embodiment shown in FIG. 4, the continuously adjustable potentiometer 7 has been replaced by a series of fixed resistors 7a, 7b, 7c . . . etc., which are selected so that the voltage drop across each resistor is the same and corresponds to an easily detectable change of the radius of the circle, e.g., by 5 or 10 mm. A selector switch 22 is provided to detect a plurality of voltages which appear at the junctions between adjacent ones of the resistors 7a, 7b, 7c . . . etc. An electronic sequential switch 20 periodically scans the detected voltages and applies them to lead 8. The further operation is analogous to the one described with reference to FIG. 3. The electronic sequential switch 20 is triggered by the sine wave generator 5 via lead 14. Because in this embodiment the sequential switch must not switch to another position until the sequential switch 20 has moved through all scanning positions rather than after each period of the sine wave generator but a pulse scaler 21 is included in lead 14 and ensures that the sequential switch 15 is operated only in response to every $n$th control pulse. As will be described hereinafter, the scale factor will depend on the function of the sequential switch 20. This change of the circuit arrangement has two results. The radius of the measuring circle is changed intermittently rather than continuously. A plurality of concentric circles rather than a single one are displayed on the fluorescent screen and are spaced an exactly known distance apart. With the circuit arrangement shown, three such circles will be traced. The selector switch 22 is one adjusted so that the point to be measured lies within the circular ring but it is not necessary that one of the three circles extends through the point. The radius of the intermediate circle is then indicated by the instrument 9 or by a scale on the selector switch 22. In that case, the deviation of the point to be measured from that value can be estimated in view its position between the circles with an accuracy which is sufficient for most cases. When the three positions of the sequential switch 20 are designated $a$, $b$, $c$ and the sequential switch is cyclically operated, i.e., in the sequence $a$, $b$, $c$, $a$, $b$, $c$, $a$, $b$, $c$ . . . , all three cycles will be displayed with the same brightness and the scaler 21 would have to transmit only every third control pulse. On the other hand, when the sequential switch 20 is designed to reciprocate in the sequence $a$, $b$, $c$, $b$, $a$, $b$, $c$, $b$, $a$ . . . etc., the intermediate circle, the radius of which is a measure of the distance, will appear brighter because it will be traced more often per unit of time than the outer and inner circles so that the middle circle is emphasized and the measurement will be facilitated. In this case the scaler 21 must transmit only every fourth clock pulse to the sequential switch 15.

It has already been mentioned that all adjustments required for the measurement can be performed with a single control knob. An embodiment which meets that requirement is shown in FIG. 5. A U-shaped member 23 is fixed to the unit. One limb of the U-shaped member carries a potentiometer 24, which serves also as a bearing. The other limb carries a bearing 25. Two stub shafts 26 extending in a $y$ direction are mounted in respective ones of said bearings and carry a frame 27 or are secured thereto. A second potentiometer 28 and a bearing 29, which is opposite to the potentiometer 28, are secured to the frame 27. A shaft 30 extends in the $x$ direction through the components 28 and 29. A third potentiometer 7 corresponding to the component 7 of FIG. 3 is secured to the shaft 30 between components 28 and 29, and has a shaft 31, which extends in $z$ direction in a position of rest and is connected to a control knob 32. When the control knob 32 is moved in the $yz$ plane, the shaft 30 will be turned to change the setting of the potentiometer 28. A movement of the knob 32 in the $xz$ plane will first turn the frame 27 and the shafts 26 secured thereto to change the setting of the potentiometer 24. A turning of the knob 32 about its own axis will adjust the potentiometer 7 by means of the shaft 31. Voltages $x_o$ and $y_o$ are tapped from the potentiometers 24 and 26, respectively, and used to shift the center of the measuring circle. The output voltage of the potentiometer 7 determines the magnitude of the radius of the circle. This arrangement will suitably be mounted in such an orientation that the center of the circle is moved in analogy to the movement of the rotary knob 32 so that, e.g., an upward movement of the knob will result in an upward movement of the center of the circle, a movement of the knob to the right will cause the center of the circle to move to the right, etc. It will be understood that this arrangement may be used also in conjunction with the modified circuit arrangement shown in FIG. 4, provided that a corresponding multi-position switch is used rather than the potentiometer 7.

It will be understood that two or three movements can be imparted to the rotary knob at the same time in the apparatus which has been described. In that case the adjustment of the center of the circle to one of the two points to be measured will be simplified and can be performed quickly. It is also possible to provide the gimbal mount comprising the shafts 26, 30 with locking means for preventing an unintended shifting of the center of the circle during the adjustment of the radius thereof. These locking means may be operated by a pulling or pressing of the knob 32.

Various modifications of the embodiments described by way of example are included in the scope of the invention. For instance, in the embodiment shown in FIG. 4 the selector switch 22 may be omitted and the sequential switch may be arranged to scan directly the voltages appearing at all junctions between adjacent resistors 7a, 7b, 7c . . . etc., so that a relatively large number of circles having known radii will be displayed on the fluorescent screen and it will be sufficient to shift the center of these circles to one of the points to be measured and to detect that of the circles which is nearest to the second point. Because an arbitrary change of the radius is not required, the adjustment and the means for effecting such adjustment will be simplified.

In the embodiments shown by way of example, the invention is applied to the measurement of the distance between two points of a fluorescent screen and this distance is represented by the radius of a circle displayed on the fluorescent screen and is related to a distance between two points in a region which is additionally displayed on the fluorescent screen. The invention may also be applied to the measurement of the distance between two points on a fluorescent circle irrespective of the nature of such additional display. On the other hand, it is apparent from the foregoing description that the invention may be used to measure the distance between two points in a region displayed on a fluorescent screen as the radius of a circle which is centered on one of said points and extends in close proximity to the other of said points and is displayed on said fluorescent screen by a line which need not necessarily be circular.

What is claimed is:

1. Equipment for measuring the distance between first and second points, comprising
a fluorescent screen,
first display control means for generating displays of said first and second points on said fluorescent screen, and
second display control means for displaying on said fluorescent screen a first mark, which coincides with the display of said first point, for displaying on said fluorescent screen a linear second mark, and for varying in a controlled manner a parameter which controls the position of said second mark on said fluorescent screen to move said second mark to a plurality of positions, in each of which said second mark constitutes a display of a circle which is centered on said first point, inclusive of one position in which said second mark is in close proximity to the display of said second point, said parameter having a predetermined, known relation to the radius of said circle so that the value of said parameter is a measure of the distance between said first and second points when said second mark is in said one position and said first mark coincides with the display of said first point,
said second display control means comprising
first and second deflecting voltage inputs adapted to receive respective deflecting voltages for controlling the display on said screen,
a generator for generating a sine wave voltage,
sine voltage control means for varying said sine voltage,
a quadrature phase shifter arranged to receive said sine wave voltage and to convert it into a cosine wave voltage,
a first d.c. voltage source for delivering a first d.c. output voltage,
a second d.c. voltage source for delivering a second d.c. output voltage,
each of said d.c. voltage sources being adjustable to vary its output voltage independently of the output voltage of the other d.c. voltage source,
a first analog connected to said generator and to said first d.c. voltage source and adapted to deliver a first sum voltage which equals the sum of said sine wave voltage and said first d.c. voltage,
a second analog adder connected to said phase shifter and to said second d.c. voltage source and adapted to deliver a second sum voltage which equals the sum of said cosine wave voltage and said second d.c. voltage, and
a sequential switch having a first pair of inputs connected to receive said first d.c. voltage and said second sum voltage, respectively, a second pair of inputs connected to receive said second d.c. voltage and said first sum voltage, respectively, a third pair of inputs connected to receive said first and second sum voltages, respectively, and a pair of outputs connected to said first and second deflecting voltage inputs, respectively,
said sequential switch being operable to connect said pairs of inputs in a cyclical sequence to respective ones of said outputs.

2. Equipment for measuring the distance between first and second points on a fluorescent screen, comprising display control means for displaying on said fluorescent screen a first mark, which coincides with said first point, and for displaying on said fluorescent screen a second mark, which consists of at least part of a circle that is centered on said first point, varying in a controlled manner a parameter which controls the position of said second mark on said fluorescent screen and has a predetermined, known relation to the radius of said circle to move said second mark radially to a plurality of positions, inclusive of a position in which said second mark is in close proximity to said second point so that the value of said parameter is a measure of the distance between said first and second points when said second mark is in said one position and said first mark coincides with said first point, said display control means comprising
first and second deflecting voltage inputs adapted to receive respective deflecting voltages for controlling the display on said screen,
a generator for generating a sine wave voltage,
sine voltage control means for varying said sine voltage,
a quadrature phase shifter arranged to receive said sine wave voltage and to convert it into a cosine wave voltage,
a first d.c. voltage source for delivering a first d.c. output voltage,
a second d.c. voltage source for delivering a second d.c. output voltage,
each of said d.c. voltage sources being adjustable to vary its output voltage independently of the output voltage of the other d.c. voltage source,
a first analog connected to said generator and to said first d.c. voltage source and adapted to deliver a first sum voltage which equals the sum of said sine wave voltage and said first d.c. voltage,
a second analog adder connected to said phase shifter and to said second d.c. voltage source and adapted to deliver a second sum voltage which equals the sum of said cosine wave voltage and said second d.c. voltage, and
a sequential switch having a first pair of inputs connected to receive said first d.c. voltage and said second sum voltage, respectively, a second pair of inputs connected to receive said second d.c. voltage and said first sum voltage, respectively, a third pair of inputs connected to receive said first and second sum voltages, respectively, and a pair of outputs connected to said first and second deflecting voltage inputs, respectively,
said sequential switch being operable to connect said pairs of inputs in a cyclical sequence to respective ones of said outputs.

3. Equipment for measuring the distance between first and second points on a fluorescent screen, comprising
display control means for displaying on said fluorescent screen a first mark, which coincides with said first point, and for displaying on said fluorescent screen a second mark, which consists of at least part of a circle that is centered on said first point, varying in a controlled manner a parameter which controls the position of said second mark on said fluorescent screen and has a predetermined, known relation to the radius of said circle to move said second mark radially to a plurality of positions, inclusive of a position in which said second mark is in close proximity to said second point so that the value of said parameter is a measure of the distance between said first and second points when said second mark is in said one position and said first mark coincides with said first point,
said display control means comprising
a generator for generating a sine wave voltage,
a voltage divider for deriving a plurality of different known derived sine wave voltages from said sine wave voltage,
a scanning switch for sequentially scanning said derived sine voltages,
a quadrature phase shifter arranged to sequentially receive said derive sine wave voltages from said voltage divider and to convert each of them into a corresponding cosine wave voltage,
a first d.c. voltage source for delivering a first d.c. output voltage,
a second d.c. voltage source for delivering a second d.c. output voltage,
each of said d.c. voltage sources being adjustable to vary its output voltage independently of the output voltage of the other d.c. voltage source,
a first analog adder connected to said voltage divider and to said first d.c. voltage source and adapted to sequentially deliver first sum voltages which equal the sums of respective ones of said derived sine wave voltages and said first d.c. voltage,
a second analog adder connected to said phase shifter and to said second d.c. voltage source and adapted to sequentially deliver second sum voltages which equal the sums of respective ones of said cosine wave voltages and said second d.c. voltage, and
a sequential switch having a first pair of inputs connected to receive said first d.c. voltage and said second sum voltages, respectively, a second pair of inputs connected to receive said second d.c. voltage and said first sum voltages, respectively, a third pair of inputs connected to receive said first and second sum voltages, respectively, and a pair of outputs connected to said first and second deflecting voltage inputs, respectively,
said sequential switch being operable to connect said pairs of inputs in a cyclical sequence to respective ones of said outputs.

4. A display control unit for controlling the display on a fluorescent screen, comprising
a generator for generating a sine wave voltage,
sine voltage control means for varying said sine voltage,
a quadrature phase shifter arranged to receive said sine wave voltage and to convert it into a cosine wave voltage,
a first d.c. voltage source for delivering a first d.c. output voltage,
a second d.c. voltage source for delivering a second d.c. output voltage,
each of said d.c. voltage sources being adjustable to vary its output voltage independently of the output voltage of the other d.c. voltage source,
a first analog connected to said generator and to said first d.c. voltage source and adapted to deliver a first sum voltage which equals the sum of said sine wave voltage and said first d.c. voltage,
a second analog adder connected to said phase shifter and to said second d.c. voltage source and adapted to deliver a second sum voltage which equals the sum of said cosine wave voltage and said second d.c. voltage, and
a sequential switch having a first pair of inputs connected to receive said first d.c. voltage and said second sum voltage, respectively, a second pair of inputs connected to receive said second d.c. voltage and said first sum voltage, respectively, a third pair of inputs connected to receive said first and second sum voltages, respectively, and a pair of outputs adapted to be connected to respective deflecting voltage inputs adapted to receive respective deflecting voltages for controlling the display on said screen,
said sequential switch being operable to connect said pairs of inputs in a cyclical sequence to respective ones of said outputs.

5. A display control unit as set forth in claim 4, in which a single control knob is provided, which is operatively connected to said sine voltage control means and to said first and second d.c. voltage sources and is operable to adjust said sine wave voltage, said first d.c. voltage and said second d.c. voltage independently of each other.

6. A display control unit as set forth in claim 5, in which
a gimbal mount comprises first and second shafts having axes intersecting at right angles to each other,
said first shaft is rotatable to adjust said first d.c. voltage,
said second shaft is rotatable to adjust said second d.c. voltage,
said knob is connected to said sine wave voltage control means by a third shaft, which is rotatable to vary said sine wave voltage and which is connected to said gimbal mount for pivotal movement about the axes of both said first and second shafts, and
each of said second shafts is arranged to rotate about its axis in unison with said third shaft.

7. A display control unit as set forth in claim 4, in which said sequential switch is triggered by said sine wave voltage generator.

8. A display control unit as set forth in claim 7, in which said sequential switch is triggered by said sine wave voltage generator.

9. A display control unit for controlling the display on a fluorescent screen, comprising
a generator for generating a sine wave voltage,
a voltage divider for deriving a plurality of different known derived sine wave voltages from said sine wave voltage,
a scanning switch for sequentially scanning said derived sine voltages,
a quadrature phase shifter arranged to sequentially receive said derive sine wave voltages from said voltage divider and to convert each of them into a corresponding cosine wave voltage,
a first d.c. voltage source for delivering a first d.c. output voltage,
a second d.c. voltage source for delivering a second d.c. output voltage,
each of said d.c. voltage sources being adjustable to vary its output voltage independently of the output voltage of the other d.c. voltage source,
a first analog adder connected to said voltage divider and to said first d.c. voltage source and adapted to sequentially deliver first sum voltages which equal the sums of respective ones of said derived sine wave voltages and said first d.c. voltage,
a second analog adder connected to said phase shifter and to said second d.c. voltage source and adapted to sequentially deliver second sum voltages which equal the sums of respective ones of said cosine wave voltages and said second d.c. voltage, and
a sequential switch having a first pair of inputs connected to receive said first d.c. voltage and said second sum voltages, respectively, a second pair of inputs connected to receive said second d.c. voltage and said first sum voltages, respectively, a third pair of inputs connected to receive said first and second sum voltages, respectively, and a pair of outputs connected to said first and second deflecting voltage inputs, respectively,
said sequential switch being operable to connect said pairs of inputs in a cyclical sequence to respective ones of said outputs.

10. A method of measuring the distance between first and second points on a fluorescent screen, comprising
(a) displaying on the fluorescent screen a first visible mark and a second visible mark, the second visible mark consisting of at least part of a circle having a center point and the first visible mark being the center point,
(b) moving the first visible mark into coincidence with the first point, and
(c) varying in a controlled manner a parameter controlling the position of the second visible mark on the fluorescent screen, the parameter having a predetermined, known relation to the radius of the circle, until the second mark is moved radially to a position coinciding with the second point, the value of the parameter being a measure of the distance between the first and second points.

11. The measuring method of claim 10, further comprising the step of displaying auxiliary circles concentric with the circle about said center point, the auxiliary circles being spaced apart radially by predetermined, known distances.

12. The measuring method of claim 10 wherein the first visible mark is displayed as a hairline cross consisting of vertical and horizontal diameters of the circle constituting the second visible mark.

13. Equipment for measuring the distance between first and second points displayed on a fluorescent screen, comprising
(a) means for displaying on the fluorescent screen a first visible mark and a second visible mark, the second visible mark consisting of at least part of a circle having a center point and the first visible mark being the center point, and
(b) display control means for moving the first visible mark into coincidence with the first point and for varying a parameter controlling the position of the second visible mark on the fluorescent screen, the parameter being a signal having a predetermined, known relation to the radius of the circle, until the second mark is moved radially to a position coinciding with the second point, the value of the signal being a measure of the distance between the first and second points.

14. The measuring equipment of claim 13, wherein the display control means is operable to generate sequentially a plurality of signals of predetermined, discrete values to display a plurality of persistent visible marks in circles concentric with the circle about the center point, the circles being spaced apart radially be predetermined distances.

15. The measuring equipment of claim 13, wherein the display control means comprises display adjusting means operable to move the first visible mark into coincidence with the first point and, in unison therewith, to move the second mark radially to the position coinciding with the second point.

* * * * *